United States Patent [19]

Villa et al.

[11] Patent Number: 4,566,599
[45] Date of Patent: Jan. 28, 1986

[54] TELECONTROL SYSTEM FOR CRANES

[75] Inventors: Ferruccio Villa, Turate; Fabio Castelli, Sesto San Giovanni, both of Italy

[73] Assignee: FMC Corporation, Chicago, Ill.

[21] Appl. No.: 520,261

[22] Filed: Aug. 4, 1983

[30] Foreign Application Priority Data

Sep. 9, 1982 [IT] Italy .................. 23184 A/82

[51] Int. Cl.[4] ............................................ B66C 13/40
[52] U.S. Cl. .................. 212/160; 212/162; 212/165; 212/170
[58] Field of Search ............... 212/140, 141, 149, 153, 212/159, 160, 162–165, 170, 173; 192/0.098, 3.58, 3.57; 251/129–132; 114/144 A, 144 E

[56] References Cited

U.S. PATENT DOCUMENTS

| | | | |
|---|---|---|---|
| 3,692,157 | 9/1972 | Arnold et al. | 251/132 |
| 3,709,340 | 1/1973 | Murakami et al. | 251/132 |
| 3,774,217 | 11/1973 | Bonner et al. | 212/160 |
| 3,990,553 | 11/1976 | Holzinger et al. | 192/3.57 |
| 4,307,810 | 12/1981 | Spalluto | 212/160 |
| 4,430,652 | 2/1984 | Rothenbuhler et al. | 212/160 |

FOREIGN PATENT DOCUMENTS

| | | | |
|---|---|---|---|
| 1091084 | 11/1967 | United Kingdom | 212/170 |
| 1288345 | 9/1972 | United Kingdom | 212/170 |
| 1337356 | 11/1973 | United Kingdom | 212/170 |

Primary Examiner—Trygve M. Blix
Assistant Examiner—Stephen P. Avila
Attorney, Agent, or Firm—Richard B. Megley; Ronald C. Kamp

[57] ABSTRACT

A control for a crane having a plurality of pressure-activated clutches with a control panel in the cab on a swingable upper works. A lightweight portable control panel is connected by an umbilical cord to the rotating joint and a switch selectively connects either the portable panel or the cab panel to an amplifier. An encoder in each panel provide redundant control signals to the amplifier which amplifies the signal with less noise and passes the amplified signal to a decoder which selects the proper current source to activate a solenoid-actuated hydraulic valve to modulate hydraulic pressure to the clutch selected by operation of a control lever on the selected one of the two panels.

3 Claims, 2 Drawing Figures

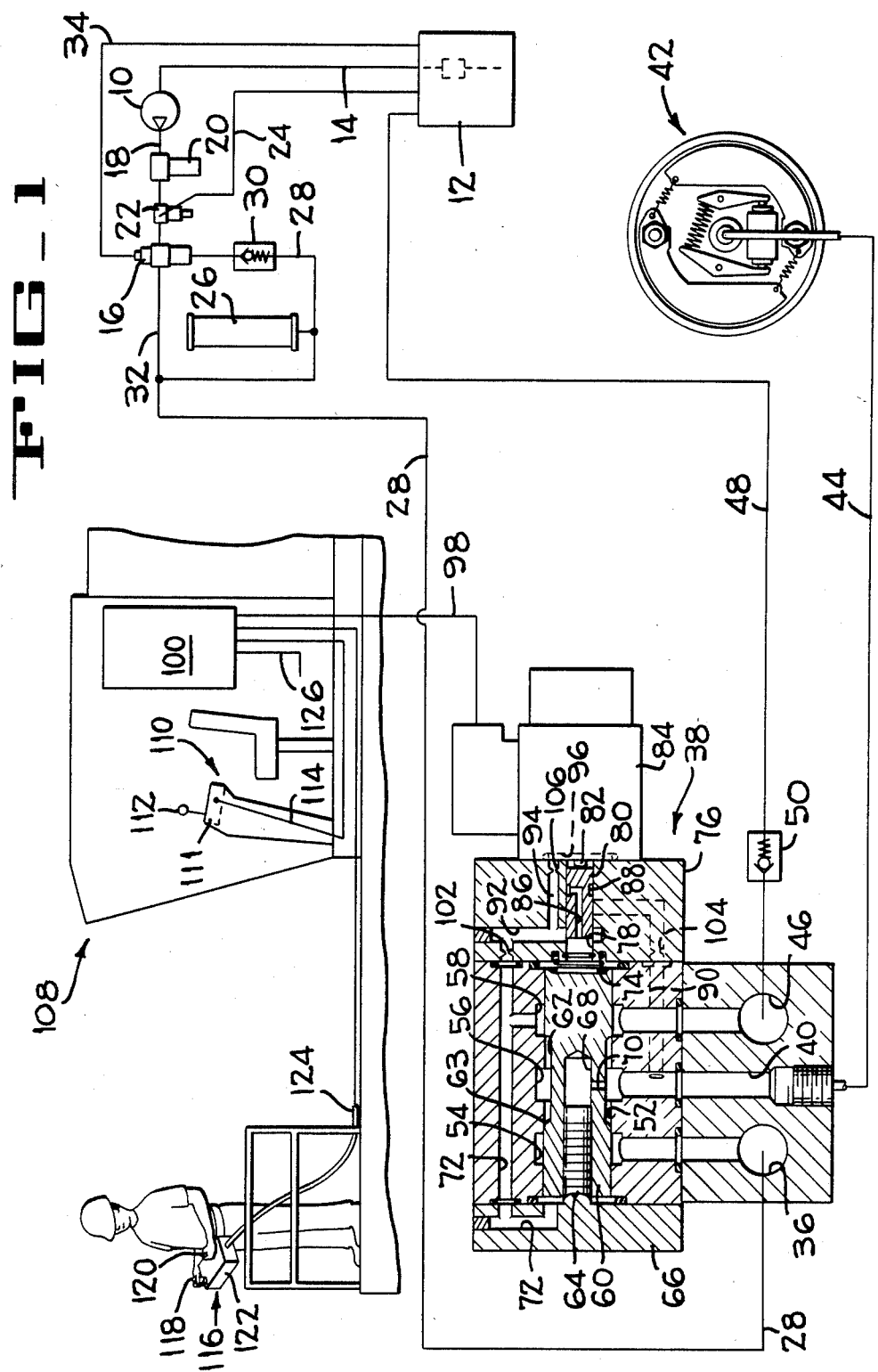
FIG_1

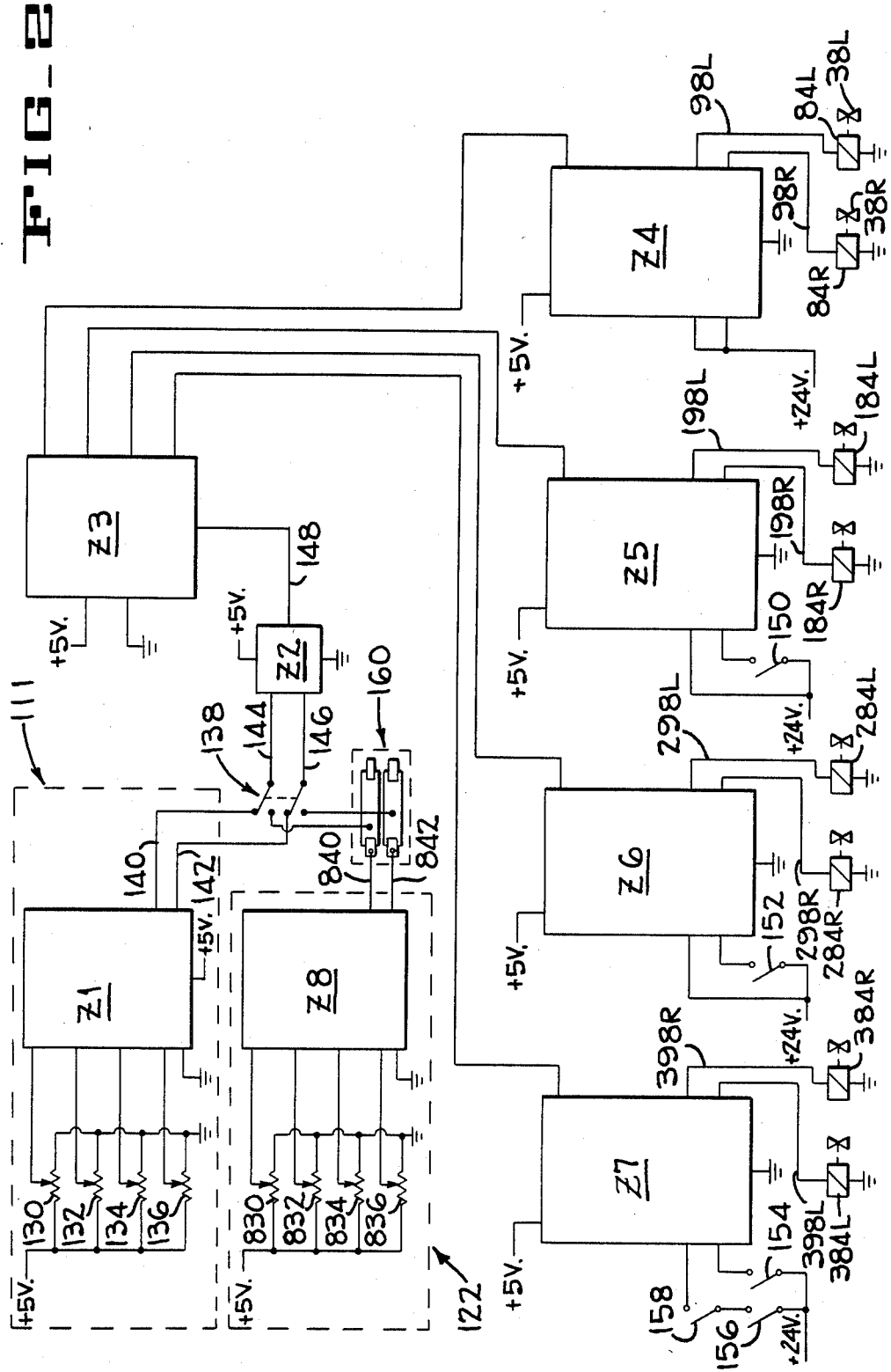

TELECONTROL SYSTEM FOR CRANES

BACKGROUND AND SUMMARY OF THE INVENTION

Precise control of the various functions of a crane, e.g. swing, boom angle and rope drums, is critical. In many cranes control of these functions is by means of hydraulically actuated clutches, and consequently the engagement of these clutches must be precisely controlled. Modulation of the flow is not as effective a means for control of clutch engagement as is the modulation of the pressure to these clutches, because the force of clutch engagement is directly related to the pressure in the clutch. A variable pressure valve arranged to be mechanically shifted by a manual control lever is relatively simple to implement and is very effective in delivering hydraulic fluid under variable pressure to an associated clutch. However, the use of a mechanical connection between the control lever and the valve is often difficult and invariably includes pivot connections which are subject to wear, require frequent maintenance, such as lubrication, and often need periodic adjustment and/or replacement of certain parts. In addition, a mechanical control system is limited to providing control capability from a single location. In certain crane installations, e.g. offshore platforms, it is often desirable for an operator to maintain visual contact with the load to be picked or placed.

In the case of an offshore platform, for example, the platform supporting the crane is elevated a considerable distance above the water level. A ship containing the load to be picked by the crane moves vertically in response to wave motion on the surface of the water. In order to avoid damage to the ship and/or the load, it is important that picking of the load be initiated at or near the peak of the ship's vertical motion because the rate at which the ship moves upward under the influence of the wave is often faster than the rate at which the crane can raise the load. It is, therefore, advantageous for the crane operator to observe the relation of the ship and the waves, which relationship is obscured from the operator's cab by the deck of the platform.

The present invention permits pressure modulation of the control clutches in a crane selectively from more than one location, provides a simplified control system which minimizes pivot connections and the concomitant maintenance and repair problems, and which minimizes or is devoid of the aforementioned problems, disadvantages or limitations.

BRIEF DESCRIPTION OF THE DRAWINGS

FIG. 1 is a pictorial and electro-hydraulic schematic representation of a preferred embodiment of the invention.

FIG. 2 is a schematic of an electronic circuit utilized in connection with the embodiment of FIG. 1.

DESCRIPTION OF A PREFERRED EMBODIMENT

Referring now to FIG. 1, a pump 10, which may be a simple gear pump, draws hydraulic fluid from a reservoir 12 through conduit 14 and discharges fluid under pressure to an unloading valve 16 through conduit 18. A filter 20 is interposed in conduit 18, as is a pressure release valve 22 which opens to connect conduit 18 with the reservoir 12 through conduit 24 when pressure in conduit 18 exceeds a pre-determined level. The unloader valve 16 charges an accumulator 26 through conduit 28 containing a check valve 30 permitting fluid flow only from the unloader valve 16 to the accumulator 26. When the accumulator 26 has been sufficiently charged, the resultant pressure is communicated to the unloader valve 16 through pilot line 32, which pressure shifts the unloader valve 16 to permit low resistance return of fluid to the reservoir 12 through conduit 34.

The conduit 28 also communicates with pressure port 36 in a valve block, indicated generally at 38. A pressure outlet port 40 in valve block 38 connects with a conventional pressure actuated, spring release shoe clutch 42 through conduit 44. Another port 46 is connected to the reservoir 12 through conduit 48 having a check valve 50 therein for permitting fluid flow only toward the reservoir 12.

The valve block 38 is provided with a major bore 52 having three internal grooves 54, 56 and 58 which are connected respectively with the ports 36, 40 and 46. A large valve spool 60 having a peripheral groove 62, including metering notches 63, on the exterior is reciprocably retained within the bore 52. The groove 62 has an axial length which is less than the separation between the outer grooves 54 and 56, so that communication can be established between the center groove 56 and either one, and only one, of the outer grooves 54 and 56 as the spool 60 is moved each way from a central position in bore 52. A fixed rod 64 attached to the end cap 66 forming a part of the valve block 38 engages a central blind bore 68 in the spool 60. The rod 64 has a multitude of sealing lands to permit the spool 60 to reciprocate relative to the spool 60 while maintaining a fluid seal therebetween. A passage 70 in the spool 60 extends between the central bore 68 and the exterior groove 62 and communicates the pressure in groove 56 and port 40 to the central bore 68. A passage 72 connects the groove 58 with the left annular face of the spool 60. A light compression spring 74 seated in the end cap 76 also forming a part of valve block 38 bears on the spool 60 and urges it toward the left.

A small bore 78 extends through the end cap 76 and communicates with the major bore 52. A small valve spool 80 is sealingly shiftable within the bore 78 and is connected by affixed rod 82 to the armature of an electric solenoid 84. The spool 80 has an internal passage 86 extending from the left face to a peripheral groove 88 on spool 80. A passage 90 extends between center port 40 and the small bore 78 near the center of is axial length. Another passage 92 connects the passage 72 with the small bore 78, while passage 94 connects passage 92 with a chamber 96 formed in the body of solenoid 84. The solenoid 84 is electrically connected by conductor 98 to a control circuit 100. The control circuit 100, more fully detailed hereinafter, provides a variable current to the solenoid 84. The current flowing through the solenoid exerts a force, acting toward the left, on the rod 82, which force is related to that current.

With no current flowing through the solenoid 84, the small spool 80 will be positioned as shown in FIG. 1 with the left end of the bore 78 in communication with the passage 92. Since passage 92 communicates with the groove 58 through passage 72, and since groove 88 is blocked from passage 90, low pressure, essentially reservoir pressure, will act on the left end of the small spool 80 urging it toward the right. This same pressure is also exerted on the right annular face of spool 80 in the opposite direction because chamber 96 connects with passage 92 through passage 94. The large spool 60 will have this same pressure, acting toward the left, exerted on its right face and in the opposite direction on its left annular face. The pressure within blind bore 98 combines with the pressure force on the annular face to balance the combined forces of spring 74 and the pressure force on the right face of spool 60.

As direct current begins to flow through the solenoid 84, a force is exerted on the rod 82 urging the small spool 80 toward the left, which blocks passage 92 and opens passage 90 to the groove 88. The pressure in port 40 is thereby communicated through internal passage 86 to the left end of bore 78 and hence to the right face of large spool 60. The pressure force acting on the right face of spool 60 displaces this spool to the left connecting the grooves 54 and 56 through groove 62. Thus, pump pressure metered across notches 63 is directed from port 36 to port 40 and hence to the clutch 42. The metered pump pressure is also communicated through the cross drill 70 to the blind bore 68 which pressure urges the large spool 60 toward its centered position blocking off pump pressure. However, movement of the large spool 60 toward the right is restricted to a fraction of the movement of the small spool 80 until the small spool has uncovered passage 92. Essentially this same pressure is directed to the left end of spool 80, through passage 90, groove 88 and internal passage 86, and urges the small spool 80 toward the position shown. However, the small spool 80 can reach the position shown only when the product of pressure in bore 78 and the area of rod 82 just exceeds the force acting on rod 82 as a result of the current flow through the solenoid 84. The higher this current flow the greater the pressure force must be to return the small spool to its centered position. Consequently, the small spool 80 controls or modulates the pressure across the notches 63 of the large spool 60 from the pump 10 to the clutch 42. This modulation is a function of the current flow through the solenoid 84. Hence, control of the current flow controls the modulation of the pressure to the clutch. In order to stabilize the spools, orifices 102, 104 and 106 are positioned within the passages 72, 90 and 94 respectively.

The control circuit 100 is preferably mounted in a protected enclosure within the cab 108 of a crane. The cab 108 includes a operator station 110 with a control panel 111 having a plurality of control levers, e.g. lever 112, including a control lever to control swing (left and right), boom (raise and lower) and one or more winch drums (raise and lower). The control panel 111 is connected to the control circuit 100 by conductor 114. A portable remote control device 116, which is relatively light weight and capable of being physically suspended from or carried by an operator, such as that device marketed by Koppen and Lethem Company of Waddinxveen, Holland, as their type HD has control levers 118 and 120 arranged in a control panel 122 similar to control panel 111. The control panel 122 is connected with the control circuit 100 through umbilical cord or conductor means 124. Electrical power is supplied to the control circuit 100 through conductor 126.

Referring now to FIG. 2, the control panel 111, includes a plurality of potentiometers 130, 132, 134 and 136, each of which is connected to and controlled by an appropriate control handle, such as joystick 112, and which respectively control swing, front drum, rear drum and the boom angle. The wiper of each potentiometer is connected with an integral circuit Z1, which is an encoder/selector and performs a digital coding of each analog signal representing the movement of the associated wiper (in this case, a voltage level) and the temporal multiplexing of such signals. Also added to the multiplex signal is information concerning the source of the encoded signals so that the type of functioning associated with a particular command can later be recognized. A basically analogous circuit is provided for control panel 122 with potentiometers 830, 832, 834 and 836, connected to a codifying/multiplexing circuit Z8. The encoder Z1 connects with a pair of terminals on a double throw, double pole switch 138 through conductors 140 and 142. The switch 138 is connected with an operational amplifier Z2 by means of conductors 144 and 146. Redundant signals are sent by the encoder Z1 and received by the amplifier Z2 and that signal with the lesser amount of noise is amplified and transmitted to the decoder Z3 through connector 148. The methods by which the signals are processed are those performed by the aforementioned device of the firm of Koppen and Lethem, to whom the reader is referred for further details.

A decoder/distributor Z3 is compatible with the encoder Z1 and is synchronized with the time multiplexed encoder Z1 to distribute the amplified analog signals in proper sequence to variable current sources Z4, Z5, Z6 and Z7, which sources correspond to the swing, front drum, rear drum and boom angle respectively. The sources Z4, Z5, Z6 and Z7 are basically controlled current generators that supply the required current intensity to operate the solenoids, for example, those produced by Koppen and Lathem in plug-in form and referred to as Type 206. The sources Z5, Z6 and Z7 are basically analogous to source Z4, the only differences being certain circuit configurations related to the type of operation they control. The swing source Z4 is connected by conductors 98L and 98R to solenoids 84L and 84R respectively; current flowing to solenoid 84L causing the crane to swing to the left and to solenoid 84R causing the crane to swing to the right. One and only one of the solenoids 84L and 84R are energized depending upon the direction from center neutral the potentiometer 130 is shifted. The amount of current directed to the selected one of these solenoids is determined by the deviation from neutral of that potentiometer wiper; the amount of current flow then modulating the pressure to an associated clutch as previously explained in connection with elements 38 and 84 shown in FIG. 1.

The variable current source Z5, depending upon the polarity of the signal received from Z3, will provide current to one of the solenoids 184R or 184L to respectively reel in or pay out wire rope on the front drum. A manually closed switch 150 in the supply line to conductor 198R will open when the hook block suspended from the front drum approaches within a predetermined distance of the crane's boom in order to prevent a two-block condition. The conductor 198L is solely dependent upon polarity for deactivation since two-blocking can not occur while the front drum block is being lowered. Similarly, a normally closed switch 152 is provided to interrupt supply voltage to the conductor 298R connected to solenoid 284R to preclude two-blocking with respect to the rear drum. The variable current source Z6 for control of the solenoids 284R and 284L is in all respects similar to source Z5 and its related components.

The variable current source Z7 controls the angle of the crane's boom; raising or increasing the angle thereof from horizontal by activating solenoid 384L and lowering or decreasing its angle by activating solenoid 384R. A normally closed switch 154 in the supply line to conductor 398L, which connects with solenoid 384L, is opened when the boom has reached the maximum angle from horizontal permissible for proper operation of the crane. When open, this switch 154 prevents further elevation of the boom by precluding the solenoid 384L from being activated. A pair of normally closed switches 156 and 158 are connected in series in the supply line to conductor 398R. One of these switches is also a limit switch to prevent the boom from being lowered below a minimum angle from horizontal permissible for proper operation of the crane. The other switch opens when the lowering of the boom, without also lowering of the hook block, will cause a two-block condition. Either of these switches 156 and 158, when open, will interrupt supply voltage to the variable current source Z7 so that conductor 398R cannot transmit current to the solenoid 384R.

Control of the crane can also be achieved through the potentiometers 830, 832, 834 and 836 connected to an encoder/selector Z8, which is connected to the other poles of switch 138 through conductor 840 and 842. The conductor 840 and 842 represent the flexible umbilical cord 124 which permits remote control of the crane, as illustrated in FIG. 1.

The potentiometers 830, 832, 834, and 836 on the remote control panel 122 are the equivalent of potentiometers 130, 132, 134 and 136 respectively on the panel 111. The encoder Z8 is also exactly comparable to encoder Z1 on panel 111. Because the panel 122 will be removed from the crane upper works, and hence will not rotate with it as the upper works swings about an essentially vertical axis, the umbilical cord must be connected to the upper works through a conventional rotating joint, such as shown at 160.

The conductor 114 and the umbilical cord, while represented in part in FIG. 1, as a single conductor, are each preferably composed of four conductors, viz. a ground wire, a supply voltage wire and two wires 140, 142 and 840, 842 for transmitting the analog voltage signal from the associated panel 111 or 122. The reason for using two wires, such as 140 and 142 or 840 and 842, is to minimize the effect of noise; the operational amplifier Z2 rejecting the signal on the wire 144 or 146 with more noise and amplifying the signal with less noise.

The switch 138 permits control of the crane from either control panel 111 in the cab of the crane or from control panel 122 at a remote location. Because the umbilical cord 124 connected to the panel 122 is flexible, and because the panel 122 itself is light weight and can be conveniently worn by the operator, the operator can readily position himself for optimum visibility anywhere within the length of the cord 124. The encoders Z1 and Z8 and the decoder Z3 may also be arranged to control more than two drums, swing and boom angle as illustrated herein. The control of the engine, e.g. starting and stopping, the swing brake and a horn, for example, may also be controlled from either panel 111 or 122 by the simple addition of switches thereto and the incorporation of those function, into the encoders Z1 and Z8 and the decoder Z3. Since some of these added features are simply on/off devices, there will be no need for variable current sources or similar devices to proportion movement. The important feature is that with these added functions, the number of wires in the umbilical cord 124 will not be affected. The additional signals being transmitted between Z8 and Z3 simply will be multiplexed in their own turn or order.

While one embodiment of the invention is disclosed herein, changes and modifications may be made therein without departing from the spirit of the invention as defined by the scope of the appended claims.

What is claimed is:

1. In a crane having a swingable upper works including a cab, a rotating joint and a pressure actuated clutch for controlling a crane function, the improvement comprising;
   a cab control panel mounted in said cab and including a cab control lever moveable to provide a cab control input;
   a cab encoder in said cab control panel for producing a cab output signal related to said control input;
   a lightweight portable control panel including a remote control lever moveable to provide a remote control input;
   a remote encoder in said portable control panel for producing a remote output signal related to said remote control input;
   an umbilical cord connecting said remote encoder in said rotating joint;
   an operational amplifier;
   a switch for selectively connecting said amplifier to one of said rotating joint and said cab encoder;
   a decoder connected to receive the output from said amplifier;
   a variable current source means connected to said decoder and producing a current flow related to the selected one of said control input;
   a solenoid means connected to said source means and producing a solenoid force related to current;
   a hydraulic valve means operatively connected to said solenoid means for modulating pressure to said clutch as a function of said solenoid force; and
   both said cab and said remote encorders producing redundant output signals and said operational amplifier selects the output signal with less noise to amplify.

2. In a crane having a swingable upper, a cab, a rotating joint and a pressure actuated clutch for controlling a crane function, the improvement comprising;
   a cab control panel mounted in said cab and including a cab control lever moveable to provide a cab control input;
   a cab encoder in said cab control panel for producing a pair of redundant cab output signals related to cab control input;
   a portable control panel having a remote control lever moveable to provide a remote control input;
   a remote encoder in said portable control panel for producing a pair of redundant remote output signals related to said remote control input;
   an umbilical cord connecting both of said remote output signals from said remote encoder to said rotating joint;
   an operational amplifier;
   a double-pole, double-throw switch for selectively connecting the redundant output signals from a selected one of said cab and remote encoders to said amplifier, said amplifier amplifying the one of said redundant signals with less noise,
   a decoder connected to receive the output from said amplifier;

a variable current source means connected to said decoder and producing a current flow related to the control input; and a solenoid-actuated hydraulic valve connected to said source means for modulating hydraulic pressure to said clutch as a function of current flow.

3. The invention according to claim 2, wherein said crane has a plurality of clutches to control a plurality of crane functions; and further comprising:

a solenoid-actuated valve associated with each clutch;

a current source operatively connected to each valve;

a distributor means in said decoder for distributing the control input to the selected one of said clutches;

a selector means in said decoder for selecting the clutch with which a particular control input is associated.

* * * * *